US008160600B2

(12) United States Patent
Saidi et al.

(10) Patent No.: US 8,160,600 B2
(45) Date of Patent: Apr. 17, 2012

(54) METHOD AND APPARATUS FOR RESOURCE ALLOCATION

(75) Inventors: Ali Saidi, St. Charles, IL (US); Silviu Chiricescu, Chicago, IL (US); Loren J. Rittle, Chicago, IL (US); Yang Yu, Rolling Meadows, IL (US)

(73) Assignee: Motorola Solutions, Inc., Shaumburg, IL (US)

( * ) Notice: Subject to any disclaimer, the term of this patent is extended or adjusted under 35 U.S.C. 154(b) by 757 days.

(21) Appl. No.: 12/264,681

(22) Filed: Nov. 4, 2008

(65) Prior Publication Data

US 2010/0111000 A1    May 6, 2010

(51) Int. Cl.
*H04W 72/04* (2009.01)
(52) U.S. Cl. .............. 455/452.1; 455/509; 455/41.2; 455/453
(58) Field of Classification Search .......... 455/452.1, 455/450, 452.2, 453, 456.1, 41.2, 41.3, 517, 455/515, 67.11, 509, 41.1, 510; 370/329, 370/311
See application file for complete search history.

(56) References Cited

U.S. PATENT DOCUMENTS

| 6,374,112 B1 * | 4/2002 | Widegren et al. | 455/452.2 |
| 2008/0045272 A1 * | 2/2008 | Wang et al. | 455/561 |
| 2008/0085718 A1 * | 4/2008 | Kuchibhotla et al. | 455/452.1 |

OTHER PUBLICATIONS

Ian Marsden, et al. , "Network Layer Overview," ZigBee Alliance, Embedded Systems Show, Oct. 12, 2006, 35 pages.
Hohlt, et al., "Flexible Power Scheduling for Sensor Networks," Third International Symposium on Information Processing in Sensor Networks, 2004 (IPSN 2004), Apr. 26-27, 2004, pp. 205-214.
Ye, et al., "Medium Access Control With Coordinated Adaptive Sleeping for Wireless Sensor Networks," IEEE/ACM Transactions on Networking (TON), vol. 12, Issue 3, Jun. 2004, pp. 493-506.
Lu, et al., "An Adaptive Energy-Efficient and Low-Latency MAC for Data Gathering in Wireless Sensor Networks," Proceedings of the 18th Internation Parallel and Distributed Processing Symposium 2004, Apr. 26-30, 2004, 8 pages.
Demirkol, et al., "MAC Protocols for Wireless Sensor Networks: A Survey," IEEE Communications magazine, vol. 44, Issue 4, Apr. 2006, pp. 115-121.

* cited by examiner

*Primary Examiner* — John J Lee

(57) ABSTRACT

A method and apparatus for allocating resources to a node in an ad-hoc communication system is provided herein. During operation, nodes of the system will receive resource allocations from their parent node. The resource allocation comprises a portion of available resources that may vary in size. Each node will determine the resource needs for its children nodes only and then dynamically assign resources to them. The resources assigned to the children nodes comprise a portion of the resources assigned to the node by its parent node. Additionally, knowledge as to how the children further allocate resources to their own children is not known by the parent, however, the children nodes must allocate a portion of their resource to their children nodes.

10 Claims, 4 Drawing Sheets

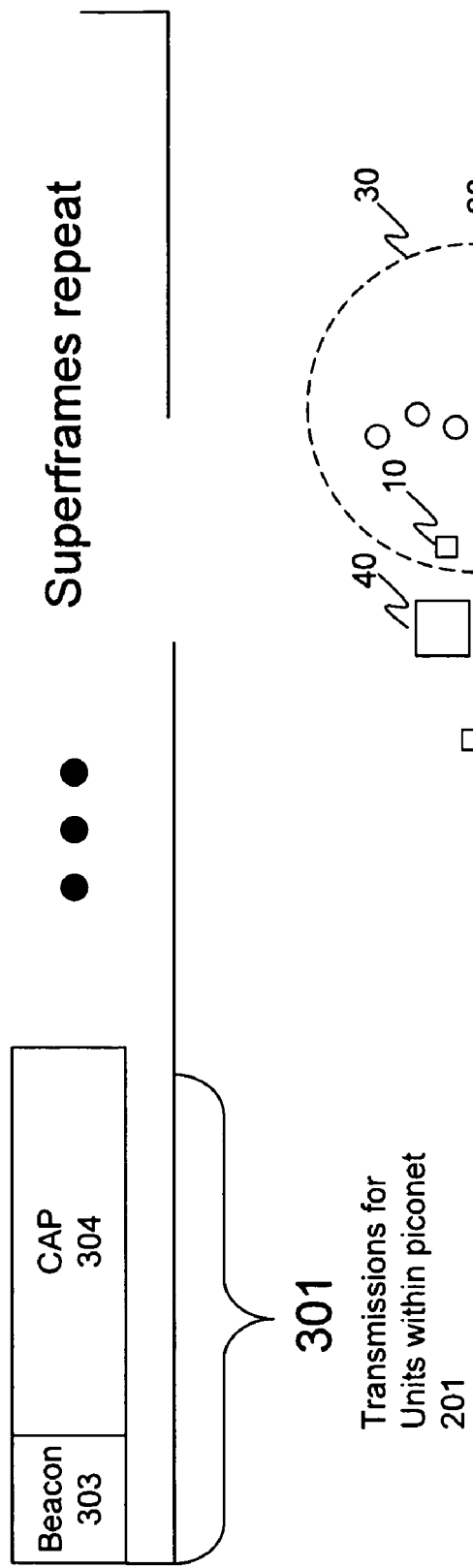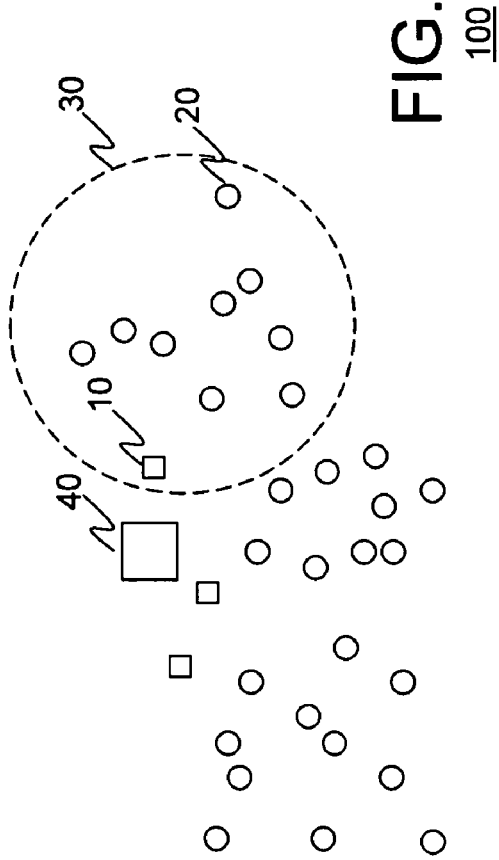

600

METHOD AND APPARATUS FOR RESOURCE ALLOCATION

FIELD OF THE INVENTION

The present invention relates generally to communication systems and in particular, to a method and apparatus for resource allocation within a communication system.

BACKGROUND OF THE INVENTION

Wireless sensor networks (WSNs) are characterized by their severe resource constraints (e.g. energy, bandwidth, processing power, and memory) which have a considerable impact on the application performance and the lifetime of the network. For example, many WSN applications require very long lifetime to avoid frequent re-charging or battery replacement of the nodes. The main difficulty in designing efficient resource constrained ad-hoc wireless networks, in general, and WSNs in particular is scalability. When using straight-forward approaches (such as those involving globally shared information), as the scale of the network grows the cost of routing, maintenance, and processing grows with it exponentially. In order to reduce processing, memory, and communication bandwidth overhead requirements within the network there is a need for a flexible system that is scalable and is capable of dynamically allocating resources for performance optimization.

BRIEF DESCRIPTION OF THE DRAWINGS

FIG. 1 is a block diagram of a communication system.

FIG. 3 illustrates a transmission scheme for the communication system of FIG. 2.

Figure 4:
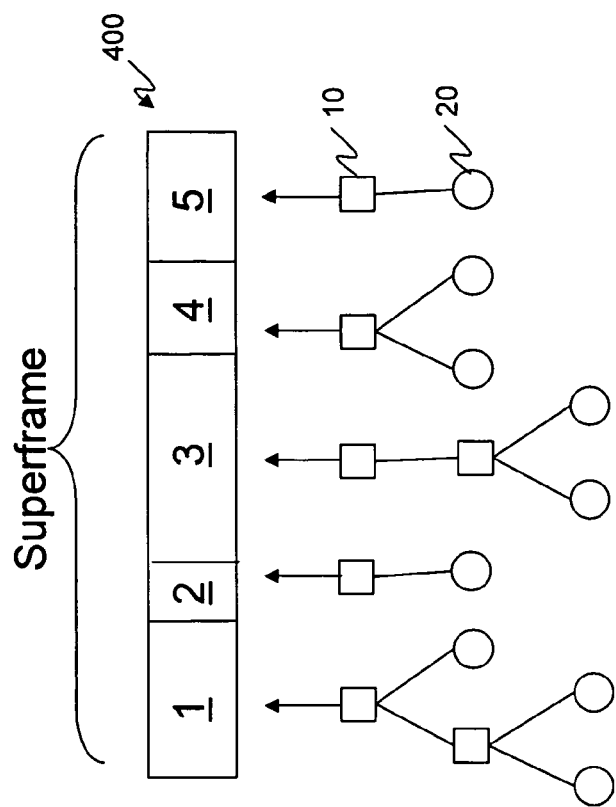
FIG. 4 illustrates the assignment of nodes to a time period of the superframe of FIG. 3.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for allocating resources to a node in an ad-hoc communication system is provided herein. During operation, nodes of the system will receive resource allocations from their parent node. The resource allocation comprises a portion of available resources that may vary in size. Each node will determine the resource needs for its children nodes only, and then dynamically assign resources to them. The resources assigned to the children nodes comprise a portion of the resources assigned to the node by its parent node. The assigned resources are based on requests from the children as well as availability of resources to the parents. To reduce the bandwidth overhead, resource requests from children are recursively aggregated by the parents and transmitted up in the tree. Therefore, knowledge as to how the children further allocate resources to their own children is not known by the parent, however, the children nodes must allocate a portion of their resource to their children nodes.

The result of the above solution is that resources are managed within each sub-tree in a distributed manner. This greatly reduces communication overhead and processing needed for nodes in a system.

The present invention encompasses a method for a node to allocate resources to its children nodes in an ad-hoc communication system. The method comprises the steps of receiving a resource allocation from a parent node, wherein the resource allocation comprises a dynamic portion of available resources, determining resource needs for its children nodes, and dynamically assigning the resources to the children nodes. The resources assigned to the children nodes comprise a portion of the resources assigned by the parent node, and knowledge as to how the children allocate resources to their children is not known to the node.

The present invention additionally encompasses a node for allocating resources to its children nodes in an ad-hoc communication system. The node comprises a receiver receiving a resource allocation from a parent node, wherein the resource allocation comprises a dynamic portion of available resources, logic circuitry determining resource needs for its children nodes, and a transmitter dynamically assigning the resources to the children nodes. The resources assigned to the children nodes comprise a portion of the resources assigned by the parent node, and knowledge as to how the children allocate resources to their children is not known to the node.

It should be noted that the described embodiment of the invention will be given with respect to a system that utilizes an ad-hoc communication system protocol defined by IEEE 802.15.3 Wireless Personal Area Networks for High Data Rates or IEEE 802.15.4 Low Rate Wireless Personal Area Networks. However one of ordinary skill in the art will recognize that other communication system protocols may utilized the present invention without varying from the scope of the invention. For example, systems employing Ad-hoc On Demand Distance Vector Routing (AODV), Dynamic Source Routing (DSR), Temporally-Ordered Routing Algorithm (TORA), Bluetooth™ standard (IEEE Standard 802.15.1), . . . etc. may utilize the described technique for resource allocation.

Prior to describing techniques for resource assignment, the following definitions provide the necessary background for utilizing the techniques described below.

Resource: A frequency, frequency block, time, time period, code, or other communication channel utilized for communicating between nodes of a system. In a system employing an IEEE 802.15 and IEEE 802.15.4 system protocol, a resource generally comprises a time assignment (period of time, and starting time) on a particular frequency.

PANC: A PANC is the Personal Area Network Coordinator. It serves as the root for the tree-based Personal Area Network. It is usually the sink to information collected by all nodes in the network. The PANC is assumed to be a ZigBee device and serves as the root of the network but may also be a general non-ZigBee device that is responsible for coordinating address assignment, address translation, general network formation, network maintenance, throughput filter, etc. Each of the nodes in one-hop communication with the PANC may serve as a root for a sub-tree under the PANC.

Sub-tree coordinator: A child node with its own children or advertising to other nodes that it will accept children. Each of the nodes in one-hop communication with a sub-tree coordinator may serve as a root for another sub-tree under that sub-tree coordinator. Therefore, it should be noted that the PANC is itself also a sub-tree coordinator.

Turning now to the drawings, wherein like numerals designate like components, FIG. 1 is a block diagram of communication system 100. Communication system 100 preferably utilizes an ad-hoc communication system protocol defined by IEEE 802.15.3 Wireless Personal Area Networks for High Data Rates or IEEE 802.15.4 Low Rate Wireless Personal Area Networks. As discussed above, one of ordinary skill in the art will recognize that other communication system protocols may be utilized without varying from the scope of the invention. For example, communication system 100 may utilize communication system protocols such as, but not limited to, Ad-hoc On Demand Distance Vector Routing (AODV), Dynamic Source Routing (DSR), Temporally-Ordered Routing Algorithm (TORA), Bluetooth™ standard (IEEE Standard 802.15.1), etc.

As shown, communication system 100 preferably includes a number of piconets 30, each comprising a coordinating device 10 (sub-tree coordinator) and a larger number of children nodes 20 in communication with coordinating device 10. Nodes 20 represent devices that communicate with each other through synchronization and the communication channel provided by coordinating devices 10. Nodes 20 can be transportable (mobile) or they can be fixed in a given place. Sub-tree coordinator devices 10 are preferably in communication with Personal Area Network Coordinator (PANC) 40. All nodes form a multi-hop tree-based PAN, with PANC 40 at the root and the sub-tree coordinator 10 at the first layer of the tree. The sub-tree coordinators 10 are the nodes in range of PANC node. Other devices are either in range of PANC or out range of the PANC by multiple communication hops.

Figure 2:
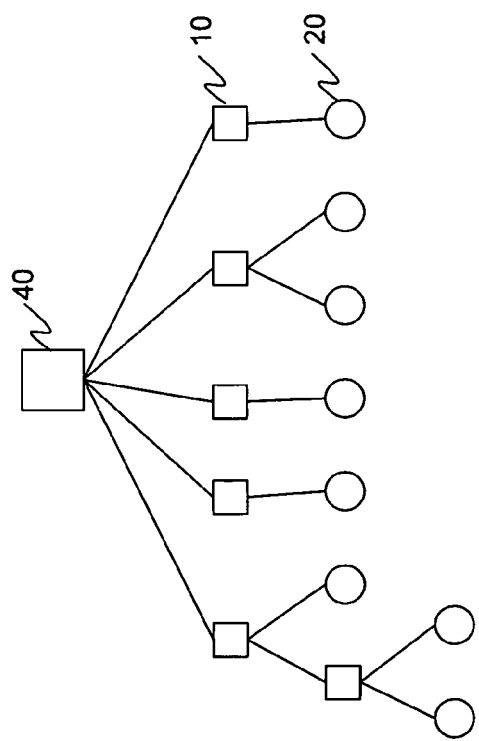
FIG. 2 is a more-detailed view of the communication system of FIG. 1.

FIG. 2 is a more detailed view of system 100. During operation a plurality sub-tree coordinators 10 (only one labeled), each form a cluster or sub-tree of devices 20 (only one labeled). As is evident, all communication will pass through at least one coordinator 10 on its way to a PANC 40. Each sub-tree coordinator 10 can have up to a maximum number ($C_m$) children nodes under it. In a similar manner, each child node 20 can have up to $C_m$ child nodes and so on.

FIG. 3 illustrates one embodiment of a transmission scheme for the communication system of FIG. 2. During communication among devices within a piconet, a specific transmission protocol is utilized by communication system 100 where each sub-tree coordinator 10 communicates with its children within a particular non-overlapping time period of superframe. Thus, a first sub-tree coordinator 10 completes all necessary transmissions with its children within a first time period of superframe 301, while a second sub-tree coordinator 10 completes all necessary transmissions with its children within a second time period of superframe 301.

During its particular time period, a sub-tree coordinator will broadcast its timing and control information within beacon field 303 and may have a Contention Access Period 304, transmission following the beacon. During its Contention Access Period (CAP), the sub-tree coordinator will communicate with nodes desiring to become its children nodes.

FIG. 4 further illustrates the transmission scheme of FIG. 3. It is assumed that the total number of direct children 10/20 of the sub-tree coordinator node performing resource allocation is N. Therefore, each superframe created by a sub-tree coordinator node can be divided into N time periods followed by a quiet or sleep period (which is not shown in this example for simplicity of depiction). Each sub-tree coordinator node 10 or child node 20 which is a direct child of the sub-tree coordinator node performing resource allocation will operate in one of these N time periods in each superframe. However, the sub-tree coordinator performing resource allocation may be awake in the full superframe. In the preferred embodiments, the sub-tree coordinator performing resource allocation and which operates on battery power or to otherwise conserve power may sleep during portions of its created superframe. This is possible whenever a direct child of the sub-tree coordinator has been allocated resources that do not further involve the sub-tree coordinator performing resource allocation for the object superframe.

Referring to FIG. 4, a sub-tree coordinator node performing resource allocation divides each superframe into exactly N time periods (in FIG. 4, assume N=5 for easy demonstration) called subsuperframes. Assume a low duty cycle sub-tree coordinator node which might be battery powered operates in only one such time period and can accept a maximal size X nodes below it. The above-described address scheme allows a full duty cycle sub-tree coordinator node to accommodate maximally N such cluster trees below it, with each subsuperframe time period handling the traffic within each of these clusters.

Communications between the sub-tree coordinator node performing resource allocation and any direct children of sub-tree coordinator nodes in each sub-tree (cluster) observe the following properties:

Each sub-tree coordinator node performing resource allocation will assign all direct children (sub-tree coordinators 10) a resource comprising a particular time period for communications. The time periods assigned to all children need not be the same period of time. For example, a first child node may be assigned a shorter period of time (smaller resource) if it has no children, while a child node that has children may be assigned a larger resource.

Each child node of the sub-tree coordinator node performing resource allocation will assign their children nodes (sub-tree coordinators 10) a portion of their time period for communications. This assignment will be unknown to the sub-tree coordinator node performing resource allocation. The time periods assigned to all children need not be the same period of time.

The process continues until all nodes have been assigned a time period for communications.

Figure 5:
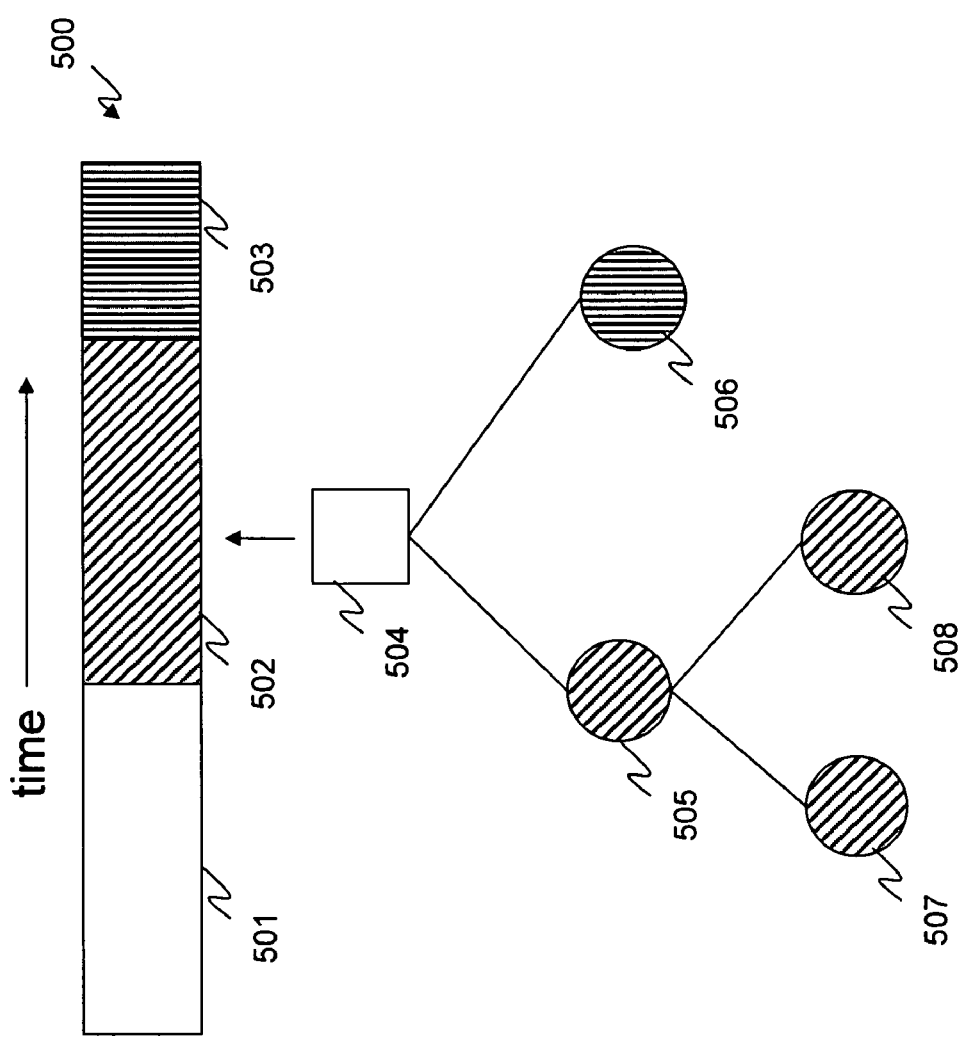
FIG. 5 illustrates resource assignment.

The above resource assignment is illustrated in FIG. 5. As shown in FIG. 5, a time period 500 has been assigned by PANC to node 504. Since node 504 has two children nodes 505 and 506, it will need to assign a portion of its resource to nodes 505 and 506. The amount of resources to allocate to each node can be determined by application requirements and other factors. The application requirements and other factors may include throughput capacity, expected lifetime of the child node, expected remaining lifetime of the child node, current battery level of the child node, or a current free memory level for the child node.

Once node 504 has determined amount of its resource to allocate to its children, the children are notified of their assignments. In this particular example, node 504 has assigned a first portion of its resource (portion 502) to child 505 and has assigned a second portion of its resource (portion 503) to child 506, reserving portion 501 for itself.

As is evident, node 505 has two children (nodes 507 and 508) assigned to it. Node 505 will have to allocate a portion of its resource to its children nodes. This assignment takes place as described above FIG. 6 is a block diagram of node 600 capable of operating within an IEEE 802.15.3 or an IEEE 802.15.4 communication system. As shown, node 600 comprises logic circuitry 601, transmitter 605, and receiver 607. Logic circuitry 601 preferably comprises a microprocessor controller, such as, but not limited to a COTS 8 or 16 bit microprocessor. In the preferred embodiment of the present invention logic circuitry 601 serves as means for controlling node 600, and as means for allocating resources. Additionally transmitter 605 and receiver 607 are common circuitry known in the art for communication utilizing a well known communication protocol, and serve as means for transmitting and receiving messages. For example, in one embodiment of the present invention, transmitter 605 and receiver 607 are well known neuRFon™ transmitters that utilize the neuRFon™ communication system protocol. Other possible transmitters and receivers include, but are not limited to transceivers utilizing Bluetooth, IEEE 802.11, or HyperLAN protocols.

Figure 7:
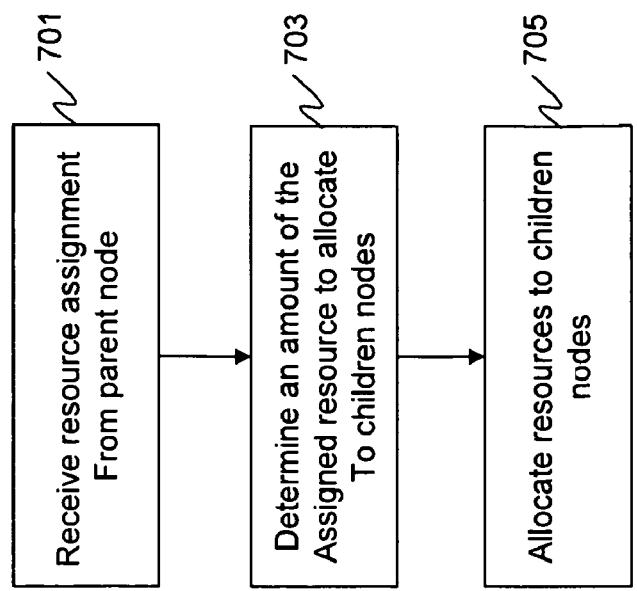
FIG. 7 is a flow chart showing operation of the node of FIG. 6.
Figure 6:
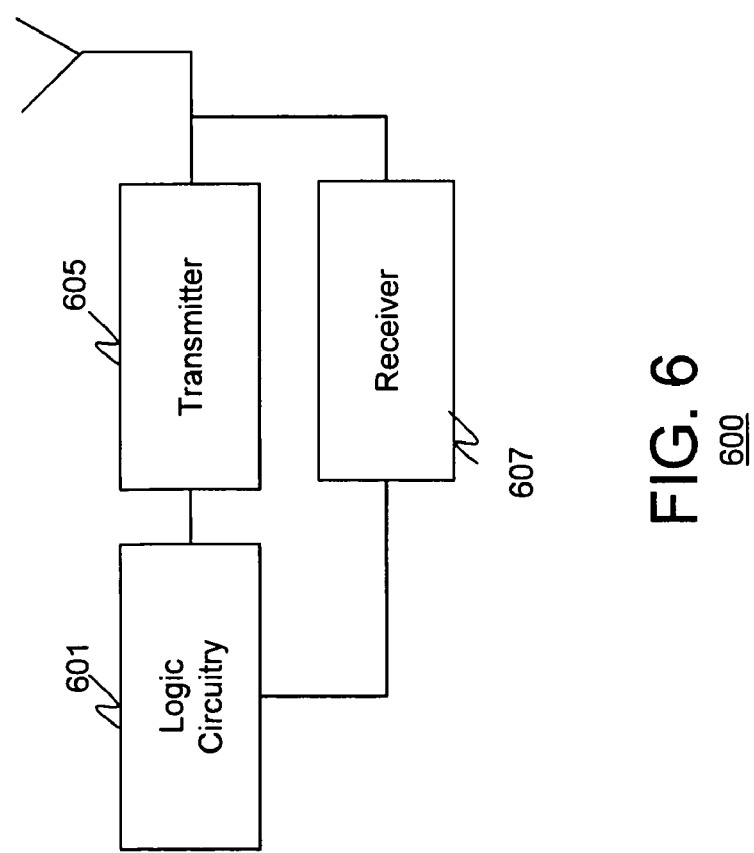
FIG. 6 is a block diagram of a node capable of operating within an IEEE 802.15.3 or an IEEE 802.15.4 communication system.

FIG. 7 is a flow chart showing operation of the node of FIG. 6. The logic flow begins at step 701 where receiver 607 receives a resource assignment from its parent node. The parent node preferably exists within an IEEE 802.15.3 or a IEEE 802.15.4 ad-hoc communication system. As discussed above, the resource allocation comprises a portion of available resources that may vary in size. At step 703 logic circuitry 601 determines resource needs for its children nodes, and an amount of its assigned resource to allocate to each of its child nodes. Resources needs are determined based on throughput capacity, expected lifetime of the child node, expected remaining lifetime of the child node, current battery level of the child node, or a current free memory level for the child node. The resource needs for the children nodes may also be based on aggregated resource requests from children nodes.

As discussed above, any resources assigned to the children nodes will comprise a portion of the resources assigned to the node by its parent node. The resource allocation comprises an exclusive transmit and receive time assignment windows within the IEEE 802.15.4 ad-hoc communication system. Additionally, knowledge as to how the children further allocate resources to their own children is not known by the node 600. At step 705 logic circuitry instructs transmitter 605 to transmit a resource allocation message to its children nodes assigning them their particular resource. As discussed, the resources assigned to its children nodes are dynamically assigned, and the resources assigned to the children nodes comprises a portion of the resources assigned to the parent node, and wherein knowledge as to how the children allocate resources to their children is not known to the node. Additionally, a resource assigned to a first child node may be different in size than a resource assigned to a second child node.

While the invention has been particularly shown and described with reference to a particular embodiment, it will be understood by those skilled in the art that various changes in form and details may be made therein without departing from the spirit and scope of the invention. It is intended that such changes come within the scope of the following claims:

The invention claimed is:

1. A method for a node to allocate resources to its children nodes in an ad-hoc communication system, the method comprising the steps of:
   receiving a resource allocation from a parent node, wherein the resource allocation comprises a dynamic portion of available resources;
   determining resource needs for its children nodes, wherein the resources needs are determined based on throughput capacity, expected lifetime of the child node, expected remaining lifetime of the child node, current battery level of the child node, or a current free memory level for the child node; and
   dynamically assigning the resources to the children nodes, wherein the resources assigned to the children nodes comprise a portion of the resources assigned by the parent node, and wherein knowledge as to how the children allocate resources to their children is not known to the node.

2. The method of claim 1 wherein a resource assigned to a first child node may be different in size than a resource assigned to a second child node.

3. The method of claim 1 wherein the parent node exists within an IEEE 802.15.3 or a IEEE 802.15.4 ad-hoc communication system.

4. The method of claim 1 wherein the resource allocation comprises an exclusive transmit and receive time assignment windows within the IEEE 802.15.4 ad-hoc communication system.

5. The method of claim 1 wherein a resource assigned to a first child node may be different in size than a resource assigned to a second child node.

6. The method of claim 1 further comprising step of:
   transmitting a resource allocation to at least one child node.

7. The method of claim 1 wherein the step of determining resource needs for its children nodes is based on aggregated resource requests from children nodes.

8. A node for allocating resources to its children nodes in an ad-hoc communication system, the node comprising:
   a receiver receiving a resource allocation from a parent node, wherein the resource allocation comprises a dynamic portion of available resources;
   logic circuitry determining resource needs for its children nodes, wherein the resources needs are determined based on throughput capacity, expected lifetime of the child node, expected remaining lifetime of the child node, current battery level of the child node, or a current free memory level for the child node; and
   a transmitter dynamically assigning the resources to the children nodes, wherein the resources assigned to the children nodes comprise a portion of the resources assigned by the parent node, and wherein knowledge as to how the children allocate resources to their children is not known to the node.

9. The node of claim 8 wherein a resource assigned to a first child node may be different in size than a resource assigned to a second child node.

10. The node of claim 9 wherein the node exists within an IEEE 802.15.3 or a IEEE 802.15.4 ad-hoc communication system.

* * * * *

UNITED STATES PATENT AND TRADEMARK OFFICE
CERTIFICATE OF CORRECTION

PATENT NO. : 8,160,600 B2
APPLICATION NO. : 12/264681
DATED : April 17, 2012
INVENTOR(S) : Saidi et al.

Page 1 of 1

It is certified that error appears in the above-identified patent and that said Letters Patent is hereby corrected as shown below:

On the Title Page

Item (75), under "Inventors", Line 4, delete "Rolling Meadows, IL (US)" and insert
-- San Jose, CA, US --, therefor.

Item (73), under "Assignee", Line 1, delete "Shaumburg," and insert -- Schaumburg, --, therefor.

Signed and Sealed this
Eighteenth Day of December, 2012

David J. Kappos
*Director of the United States Patent and Trademark Office*